(12) United States Patent
Oxley et al.

(10) Patent No.: US 7,711,382 B2
(45) Date of Patent: May 4, 2010

(54) METHOD FOR DYNAMIC GROUP CALL

(75) Inventors: Derek A. Oxley, Chandler, AZ (US);
Nandakishore A. Albal, Scottsdale, AZ (US); Gustavo A. Leal-Isla, Scottsdale, AZ (US); Bradley R. Schaefer, Chandler, AZ (US); Mark L. Shaughnessy, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 224 days.

(21) Appl. No.: 10/788,759

(22) Filed: Feb. 27, 2004

(65) Prior Publication Data
US 2005/0192041 A1    Sep. 1, 2005

(51) Int. Cl.
*H04B 7/00* (2006.01)
(52) U.S. Cl. ............................. 455/519; 455/518
(58) Field of Classification Search .............. 455/518, 455/519, 520, 521, 416
See application file for complete search history.

(56) References Cited

U.S. PATENT DOCUMENTS

| | | | | |
|---|---|---|---|---|
| 5,471,646 | A * | 11/1995 | Schultz | 455/519 |
| 5,513,381 | A * | 4/1996 | Sasuta | 455/509 |
| 5,559,876 | A | 9/1996 | Alperovich | |
| 5,625,886 | A * | 4/1997 | Raes | 455/519 |
| 5,631,904 | A * | 5/1997 | Fitser et al. | 370/261 |
| 5,635,914 | A * | 6/1997 | Petreye et al. | 340/7.46 |
| 6,018,668 | A | 1/2000 | Schmidt | |
| 6,600,928 | B1 * | 7/2003 | Ahya et al. | 455/518 |
| 6,662,010 | B1 | 12/2003 | Tseitlin et al. | |
| 6,882,856 | B1 * | 4/2005 | Alterman et al. | 455/519 |
| 6,999,783 | B2 * | 2/2006 | Toyryla et al. | 455/519 |
| 2001/0027111 | A1 | 10/2001 | Motegi et al. | |
| 2002/0141354 | A1 | 10/2002 | Niiya et al. | |
| 2003/0083086 | A1 * | 5/2003 | Toyryla et al. | 455/518 |
| 2003/0119540 | A1 * | 6/2003 | Mathis | 455/518 |
| 2004/0198376 | A1 * | 10/2004 | Chandhok et al. | 455/456.1 |
| 2005/0128997 | A1 * | 6/2005 | Zhao et al. | 370/349 |
| 2005/0143135 | A1 * | 6/2005 | Brems et al. | 455/564 |
| 2005/0164681 | A1 * | 7/2005 | Jenkins et al. | 455/412.1 |

FOREIGN PATENT DOCUMENTS

| | | |
|---|---|---|
| EP | 1168796 A1 | 1/2002 |
| EP | 1187432 A1 | 1/2002 |
| GB | 2341040 A | 3/2000 |
| JP | 2002232577 A | 8/2002 |
| JP | 2003298751 A | 10/2003 |

* cited by examiner

*Primary Examiner*—Quochien B Vuong

(57) ABSTRACT

A method for providing dynamic group call among a group of users both wireless (10-30) and wireline (40) places the selectability of the call in the hands of an originating user (10). An originating user (10) may make a fixed number of entries (80). The originating user (10) can create a dynamic group call, add a group call list for later execution, add a member to the group call list, or create a dynamic group call list and immediately execute a group call (92). The method for dynamic group call also provides for selecting a time to live for each group call entry (81) in database (60). This parameter time to live is directly selectable by the originating user (167) or the server. In addition, any member to a previous or existing group call may rejoin or reestablish the dynamic group call (220).

24 Claims, 6 Drawing Sheets

| 81 | 84 | 86 | 88 |
|---|---|---|---|
| 1 | MEMBER1,,, n | GROUPXX_origURL@serverN_carrier.com | TTL |
| 2 | MEMBER1,,, n | GROUPYY_origURL@serverN_carrier.com | TTL |
| ⋮ | | | |
| n | MEMBER1,,, n | GROUPZZ_origURL@serverN_carrier.com | TTL |

82

METHOD FOR DYNAMIC GROUP CALL

BACKGROUND OF THE INVENTION

The present invention pertains to communication systems and more particularly to communication systems supporting group calls which utilize internet protocol (IP).

Group calls are similar to conference calls in which a number of subscribers are interconnected for the purpose of common conversation. Modern technology supports both wireless and wireline users in these group calls.

Typically group calls are manually initiated by an originating user calling and establishing connection with a first participating user, then another participating user, etc. The originating user must control the selection and implement the connection to each of the participating users. This is very often time consuming and a slow lengthy process. Further, the originating user must have the capability of initiating conference calls via the originating user's local network.

In more recent times, service providers offer a bridging arrangement for connecting multiple participants in a conference call. Typically these participants call in to a common number and enter a password for security purposes and then are interconnected through the bridging service provided by the service provider. Again, this is slow and it is up to each individual participant to call in to a common conference.

Modern wireless technology provides for supporting group call functions. These arrangements typically involve dispatch services or push-to-talk (PTT) services. These group call interconnections may be made to wireline participants via the internet, for example. Typically the groups for the group call arrangements presently known are statically defined. That is a user, or administrator working on behalf of the user, must indicate to the switching network a list of participants for a group call in the background mode, or well in advance of the group call. This could be provisioned in the network by the user or an agent, and then provided some form of group identity to make the call. Then at another time an originating user may perform some signaling to initiate that he wishes to establish a group call with each of the pre-designated participants.

As the needs of the originating participant change, this predefined group membership often leads to an inappropriate group for a particular set of circumstances. Often groups are larger than they need to be, since it is unknown when a group is established who will be needed for given future communication. Also, this presents a problem of privacy, since participants may be hearing a conversation that the originating user does not want them to hear. Further, this statically defined/provisioned group call wastes network time and resources and is relatively inflexible.

Accordingly, what is needed is a method for maximizing communication efficiency for group calls in a communication system.

PREFERRED EMBODIMENT OF THE INVENTION

Figures 1, 2:
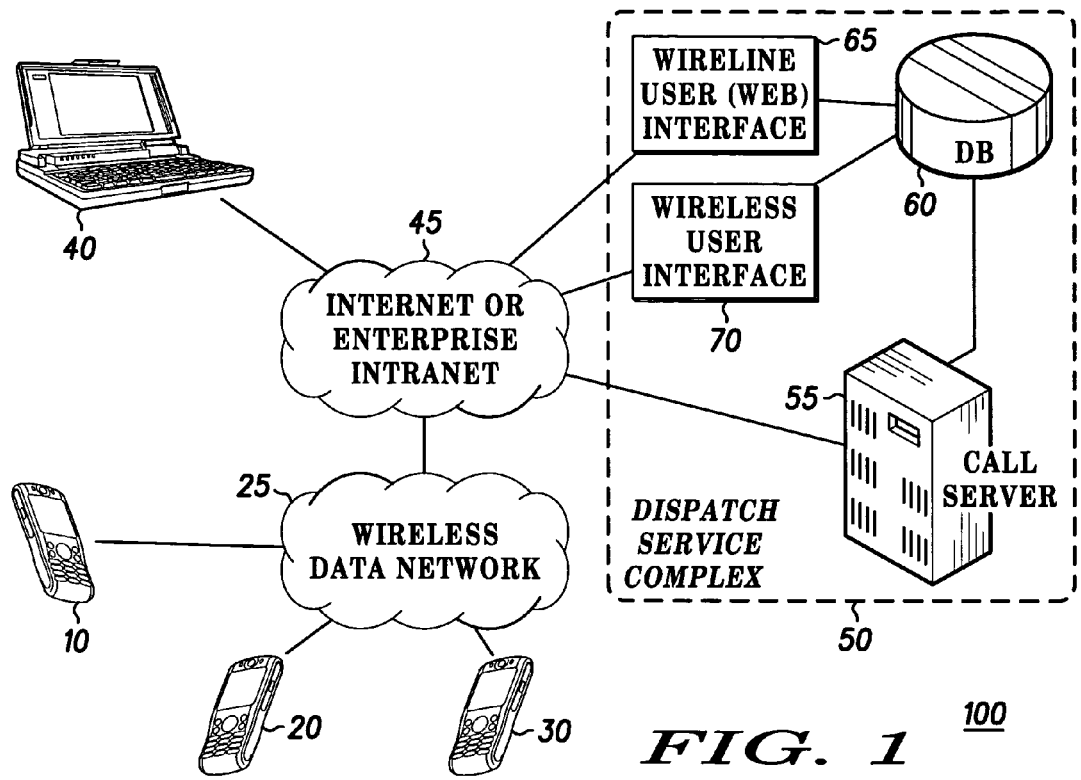
FIG. 1 is a block diagram of a communication system for group call in accordance with the present invention.
FIG. 2 is a layout of a data structure for supporting the group call method in accordance with the present invention.

Referring to FIG. 1, a block diagram of a communication system 100 including a dispatch service complex 50 and a number of user/participants 10-40. Users 10-30 happen to be wireless users with user 10 being the group call originator. These wireless users 10-30 are interfaced through a wireless network 25 to an internet or enterprise intranet 45.

Internet 45 also provides an interface for user 40. Each of the users 10-40 is coupled through internet 45 to an appropriate interface within the dispatch service complex 50. Each of the users 10-40 is coupled from internet 45 to call server 55. Database 60 provides for storage and retrieval of group call information under the direction of call server 55. Database 60 will then provide the identity of wireless users to wireless user interface 70. Internal wireless user interface 70 will provide these to the internet 45 which will disburse them to wireless data network 25 for subsequent connection with users 10-30. Similarly, database 60 will indicate the identity of wireline users to wireline user interface 65. Wireline user interface 65 will connect to internet 45 to wireline user 40.

The kind of group call supported in this disclosure is a dynamic group call (DGC). The DGC presented herein is a selectable service by a user or originator 10. At the present time such selectable dynamic group call service is also referred to as a dynamic ad hoc group call or group call service.

The dynamic group call service disclosed herein is selected and controlled by an end user designated as an originator 10. No service operator intervention is necessary to create designated groups for this dynamic group call service.

The dynamic group call service is network independent and could operate within, GSM, CDMA, iDEN, UMTS, wireless LAN and virtually any data network.

Generally, originating user 10 selects other user participants 20-40 for a group call from either their address book or by specifying their identity/address. "Nesting" of groups is permitted by this system. That is, when originator 10 selects the member participants of a group, one of the member participants may itself be a group or subgroup. Typically, originating user 10 will send the identity of the members of an ad-hoc dynamic group to the network before beginning the group call in order to minimize call setup time.

Once the group membership has been defined, the dispatch service complex 50 will create a group ID and transmit the group ID (identification) back to the originating user 10. These group Ids are dynamically assigned by the dispatch service complex 50. Alternatively, the dynamic group may also be created by the originating user 10 and immediately activated (called) for the group call service.

When the group has been created and its activation requested by originator 10, each of the target participant users 20-40 are activated and called as in a typical group call. Each of the target users is informed that this is a group call and given the group ID by the dispatch service complex 50, and the identity of the group call originator. The target handset at each target user 20-40 may store the group ID provided. With this group ID being stored by each participant 10-40, any participant may make use of the "call back service". That is, user participant 40 may reinitiate the group call after it has ended or may leave and rejoin an ongoing group call at will by using this group ID.

The group ID stored by each of the participants will remain valid until reallocated or invalidated by the dispatch service complex 50. Optionally, each defined group and group ID may have associated with it a feature termed "time to live" (TTL). This indicates a time when reached which the group ID will expire and no longer be valid.

In a preferred embodiment, group call originator 10 is allocated a number of potential or possible groups from a fixed pool of groups for all users. For example, originator 10 may have 10 entries within the database 60 for storage of group information. When all ten entries in database 60 have been used, another group creation by originator 10 may result in the oldest entry being overridden with the new group information. Other overriding schemes are also possible. Among them are first in/first out, first in/last out and least used group.

Referring to FIG. 2, a layout of a data structure 80 supporting the dynamic group call method is shown. From left to right the various fields will be discussed and explained. First, the entry field 81 indicates the number of groups actively allotted to a particular user. Group entry 82 which is indicated as N is the highest number of groups allowed to be stored for this particular user.

The next field 84 is a list of the members for each particular group. The next field 86 is the unique group ID assigned by the dispatch service complex 50 followed by the originating user's URL at server Ncarrier.com for example. This indicates the particular internet server for handling the group establishment for each of the participants to the group call.

Optionally, the next field 88 is a time to live (TTL) field. This field may indicate the life span or time to live for each dynamic group 81. The TTL field 88 may include a predefined time after which the group ID is no longer valid will be reallocated by the dispatch service complex 50. In another approach, as mentioned above, a fixed time limit may be set for each of the user groups after which the group ID will become invalid and expire. These time limits may be a day, a month, a year, etc.

Figure 3:
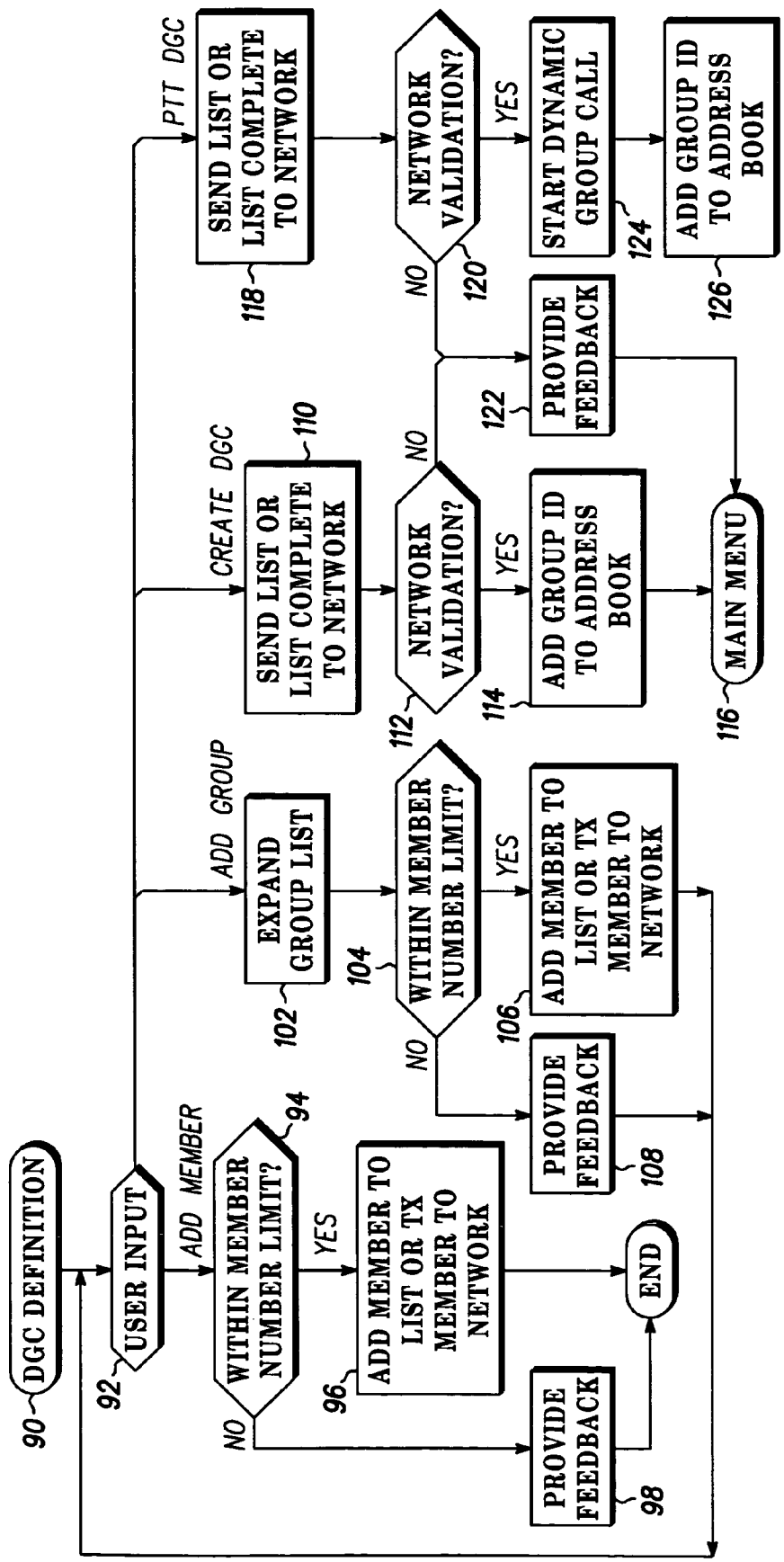
FIG. 3 is a flow chart of a group call creation by a user in accordance with the present invention.

FIG. 3 depicts a flow chart of the creation of a dynamic group call by the originating user 10. These group calls provide for a high degree of selectability of group members and timing or longevity of a given group.

The user selects the dynamic group call definition option from the menu of the originating wireless user device 10 and block 90 is entered. Block 90 transfers control to block 92. Block 92 determines from user input whether the request is to add a member to the group, add a group, create a dynamic group call or activate a previously created dynamic group call in response to the push-to-talk feature of the wireless handset. If the request indicated by the user input was to add a member to the group, block 92 transfers control to block 94 via the add member path. Block 94 first determines if the request is within the limit of members for group call. If it is not, block 94 transfers control to block 98 via the no path. Block 98 provides feedback to the user to indicate that the request cannot be accommodated and then the process is ended.

If the member is within the number of members for a group call 94 transfers control to block 96 via the yes path. In block 96 the member is added to the list and the member ID is transmitted to the network for storage in database 60. The process is then ended. Note that additional members can be added by traversing this sequence of blocks until the number of allowed members is exceeded or the user sends List Complete.

If the user input indicated that the requested function was to add an existing group to the group list (since nested groups are allowed), block 92 transfers control to block 102 via the add group path. Block 102 requests and accepts input for sequentially adding the members of the group. Also, block 102 expands the group call list. Next, block 104 determines whether the requested number of members are within the limit of members for a group call. Block 104 transfers control to block 106 via the yes path. Block 106 adds the members to the list and transmits the member Ids to the network to be stored in database 60. Then the process is ended.

If the number of members requested exceeds the limit for members of a dynamic group call, block 104 transfers control to block 108 via the no path. Block 108 provides feedback to the originating user 10 that the member limit has been exceeded, allowing the user the opportunity to make the necessary changes. Then the process is ended, but the user may continue with selections.

If the user input indicated that the create dynamic group function has been selected by originator 10, user input block 92 transfers control to block 110 via the create dynamic group path. Block 110 sends the member list or a list complete indication to the network. Next, network validation is provided by block 112. The functionality of the network validation block 112 will be explained in FIG. 4 and FIG. 5. If the network validation failed, block 112 transfers control to block 122 which provides an indication for feedback to the originating user 10. Then block 122 transfers control to the main menu, block 116 for subsequent input from user 10.

If the network validation returned as acceptable, block 112 transfers control to block 114 via the yes path. Since the network has returned the group call identity, block 114 adds the group identity to the address book of the originating user 10. Then block 114 transfers control to the main menu, block 116 awaiting further user input.

If the user input to block 92 indicated a dynamic group call having the push-to-talk function indicated, block 92 transfers control to block 118 via the PTT DGC (push-to-talk, dynamic group call) path. Block 118 sends the list or list complete indication along with the push-to-talk (PTT) indication to the network for actuation of the dynamic group call. Block 120 represents the network validation step which will be explained later in FIG. 5. If the network validation step 120 is failed, block 120 transfers control via the no path to block 122. Block 122 provides feedback to the user of the failed dynamic group call attempt. Block 122 then transfers control to main menu 116 to wait for the next user selection.

If the network validates the dynamic group call and push-to-talk request, block 120 transfers control to block 124 via the yes path. Block 124 indicates that the dynamic group call has been initiated as part of the validation process of FIGS. 4 and 5. In addition a group ID has been returned to originator 10. Next, block 126 adds the group ID, returned to originator 10, to the address book of originating user's mobile unit 10.

Figure 4:
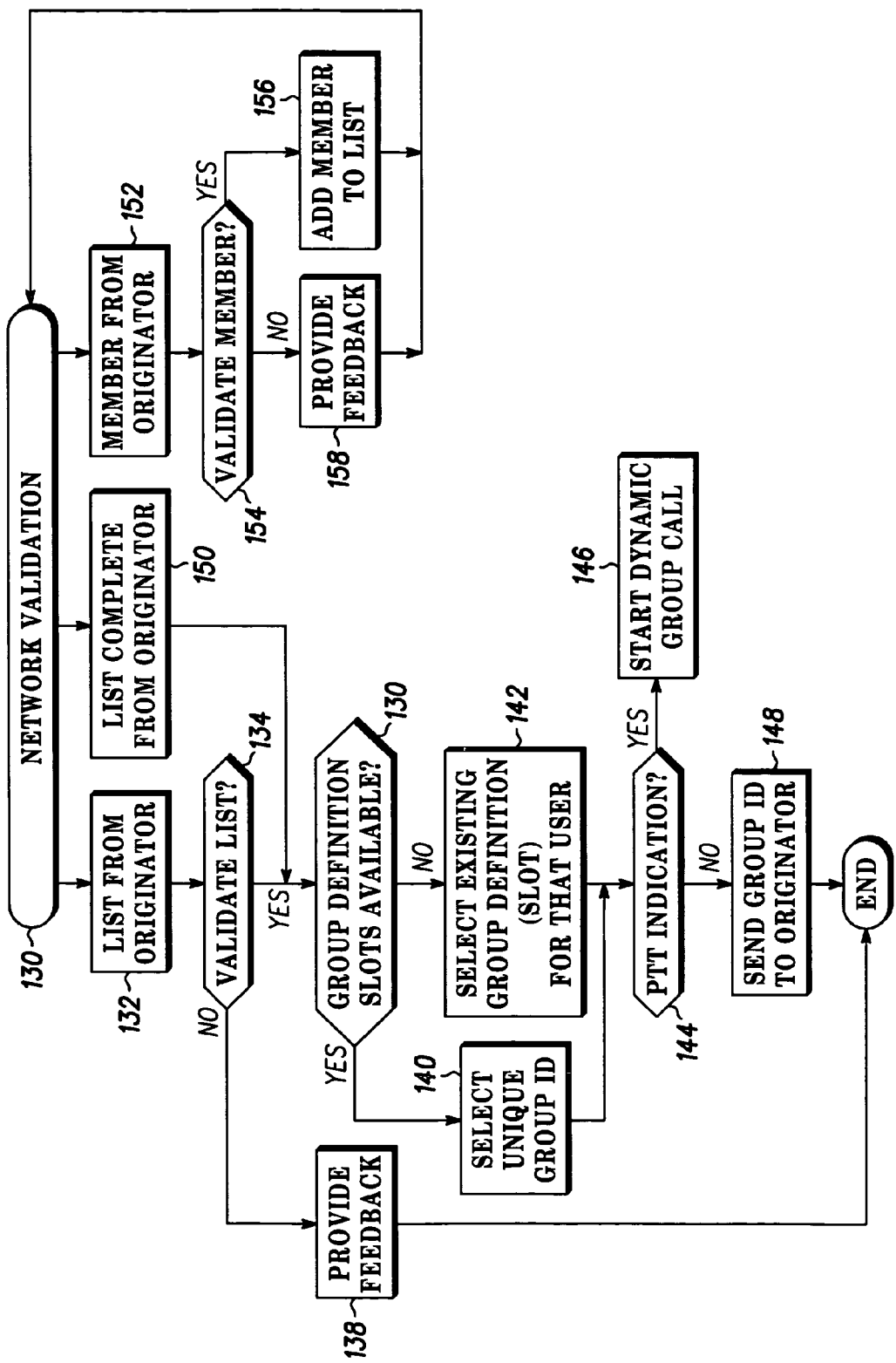
FIG. 4 is a flow chart of a group call response by the network in accordance with the present invention.

Referring to FIG. 4, a flow chart of the network validation corresponding to block 112 and 120 of FIG. 3 is shown. FIG. 4 depicts the creation of a dynamic group call group by the network corresponding to an user's 10 request.

Network validation is initiated and block 130 is entered. Block 130 determines whether it has received a list from the client, a list complete indication from the user or a request for adding a member from the user. If a list of dynamic group call members has been received, block 130 transfers control to block 132. Block 132 then transfers control to block 134. Block 134 determines whether the list received from user 10 is valid. If the list is invalid, block 134 transfers control to block 138 via the no path. Block 138 provides feedback via message transmission to user 10 to indicate that the attempted addition of a list of members for a group call is not valid. The process is then ended.

If the list is valid, block 134 transfers control to block 136 via the yes path. Block 136 determines whether any group slots are available within the user's allowable number of defined groups. If there are available slots in the group definitions for dynamic group call, block 136 transfers control to block 140 via the yes path. Block 140 selects/creates a unique group ID for the list of group members for dynamic group call that the network has just received. Then block 140 transfers control to block 144.

If no group definition slots are available, block 136 transfers control to block 142 via the no path. An existing group definition is then deleted for originator 10, block 142, and a new one created associated with the current request. The deleted group may be based on the first dynamic group definition input, the last group definition input, or the least frequently used group definition, for example. Other methods of maintaining the slots would be to reuse one of the existing group definitions and replace the current group membership with the new one. This would also imply that any TTL value associated with the old list is modified for the new definition. Block 142 then transfers control to block 144 and the processing is the same as that indicated above after block 144.

Block 144 determines whether a push-to-talk indication was sent with the member list just received. If no push-to-talk (PTT) indication was received block 144 transfers control to block 148 via the no path. Block 148 sends the group ID just selected back to user 10 for subsequent storage. The process is then ended.

If a push-to-talk indication was received along with the member list, block 144 transfers control to block 146 via the yes path. Block 146 initiates the dynamic group call and among other things returns the group ID to each of the dynamic group call members to support a call back function as will be explained infra.

If the network detects a request from user 10 to receive a complete list from originator 10 with the PTT function indicated or not, network 130 transfers control to block 150. Block 150 transfers control to block 130 which determines if there are group slot definitions available. Subsequent to that the processing is exactly as indicated supra for the process following block 134.

If network validation block 130 has detected a request to add a member to a group from user 10, block 130 transfers control to block 152. Block 152 then transfers control to block 154 which validates the number to be added to the dynamic group. If the member is validated, block 154 transfers control to block 156 via the yes path. Block 156 adds the group member to the group. Then the process is ended for this group member. If the member cannot be validated, block 154 transfers control to block 158 via the no path. Block 158 sends a message back to user 10 to indicate that the proposed addition of a member cannot be validated. The validation process is then ended.

Figure 5:
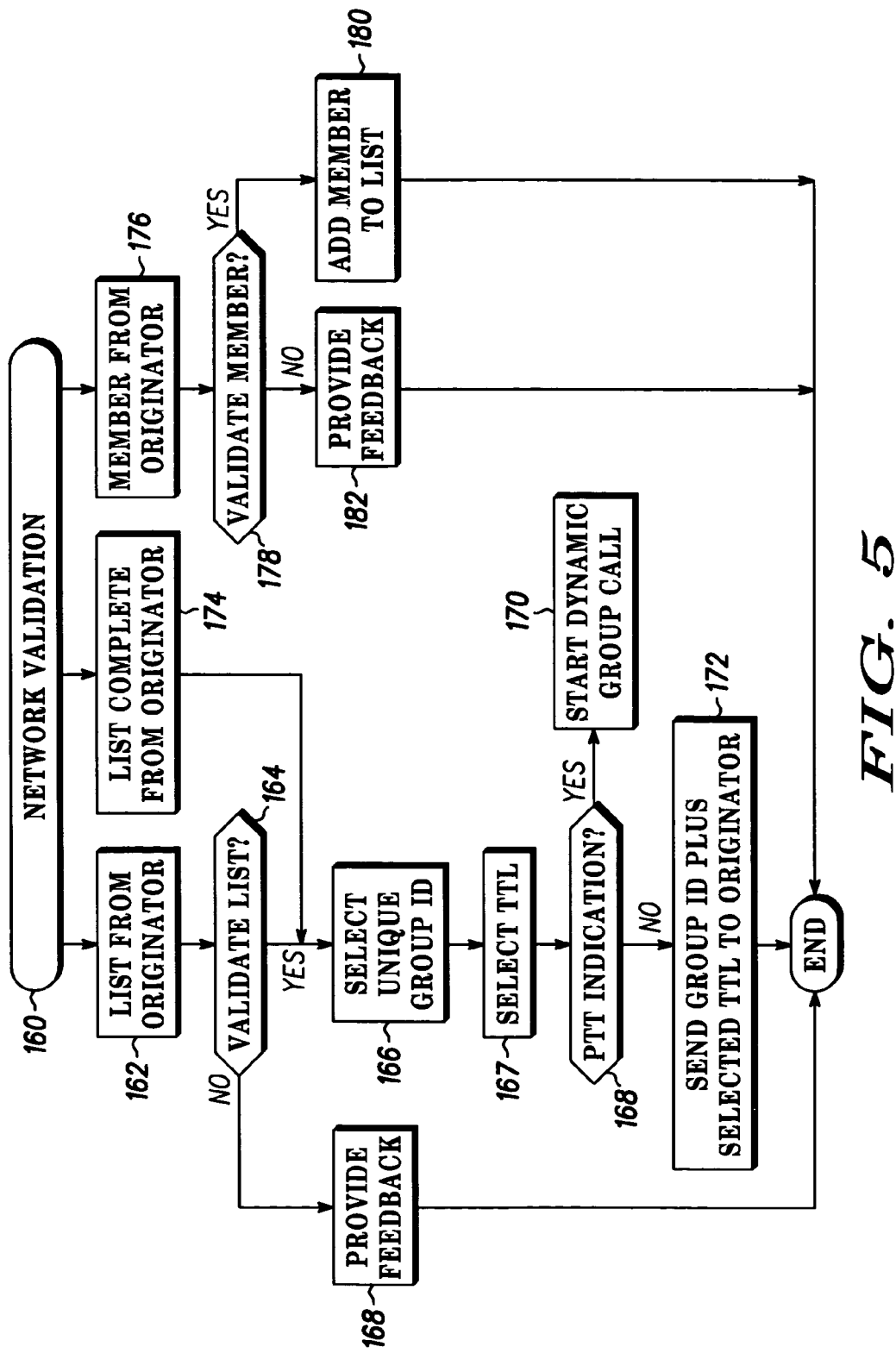
FIG. 5 is another embodiment of a group call method incorporating time to live feature in accordance with the present invention.

Referring to FIG. 5, a flow chart of the creation for dynamic group by the network is shown which includes the optional time to live feature for each group defined by the network. If the network validation process as shown in FIG. 3 detects a request to add a list from user 10, block 160 transfers control to block 162. Block 162 transfers control to block 164 to validate the list. If the list is not valid block 164 transfers control to block 168 via the no path. Block 168 returns a message to user 10 to indicate that the attempted addition of a dynamic group list has failed. Then the process is ended.

If the list of group members is valid, block 164 transfers control to block 166 via the yes path. Block 166 selects a unique group ID. Next, block 167 selects the time to live (TTL) field 88 of the particular group entry 81, for example, the TTL value transmitted by the user 10 may be a variable supplied by the user or may be a standard network parameter such as a day or a month, or maybe based on the number of groups available in the network, etc. Block 167 sets this field in the corresponding database position 88.

Next, block 168 determines whether the PTT indication was also sent with the member list. If the PTT indication is not sent, block 168 transfers control to block 172 via the no path. Block 172 sends the group ID plus the selected time to live back to the user 10. The process is then ended.

If the PTT function was indicated in the list transmitted by the user, block 168 transfers control to block 170 via the yes path. Block 170 starts the dynamic group call as will be explained infra with reference to FIG. 6.

If the network validation process block 160 has detected the list complete from the user, block 160 transfers control to block 174. Block 174 transfers control to block 166 to select the unique group ID and the process is repeated from that point on as described above after block 166.

If the network validation process block 160 detected a request from the user to add a member to the dynamic group list, block 160 transfers control to block 176. Block 176 transfers control to block 178 which determines whether the member is valid. If the member is valid for the dynamic group, block 178 transfers control to block 180 via the yes path. Block 180 adds the member to the particular list. Then the process is ended. If the member is not valid, block 178 transfers control from block 182 via the no path. Appropriate feedback messages provided back to user 10 indicate the failure to add the member. The process is then ended.

Figure 6:
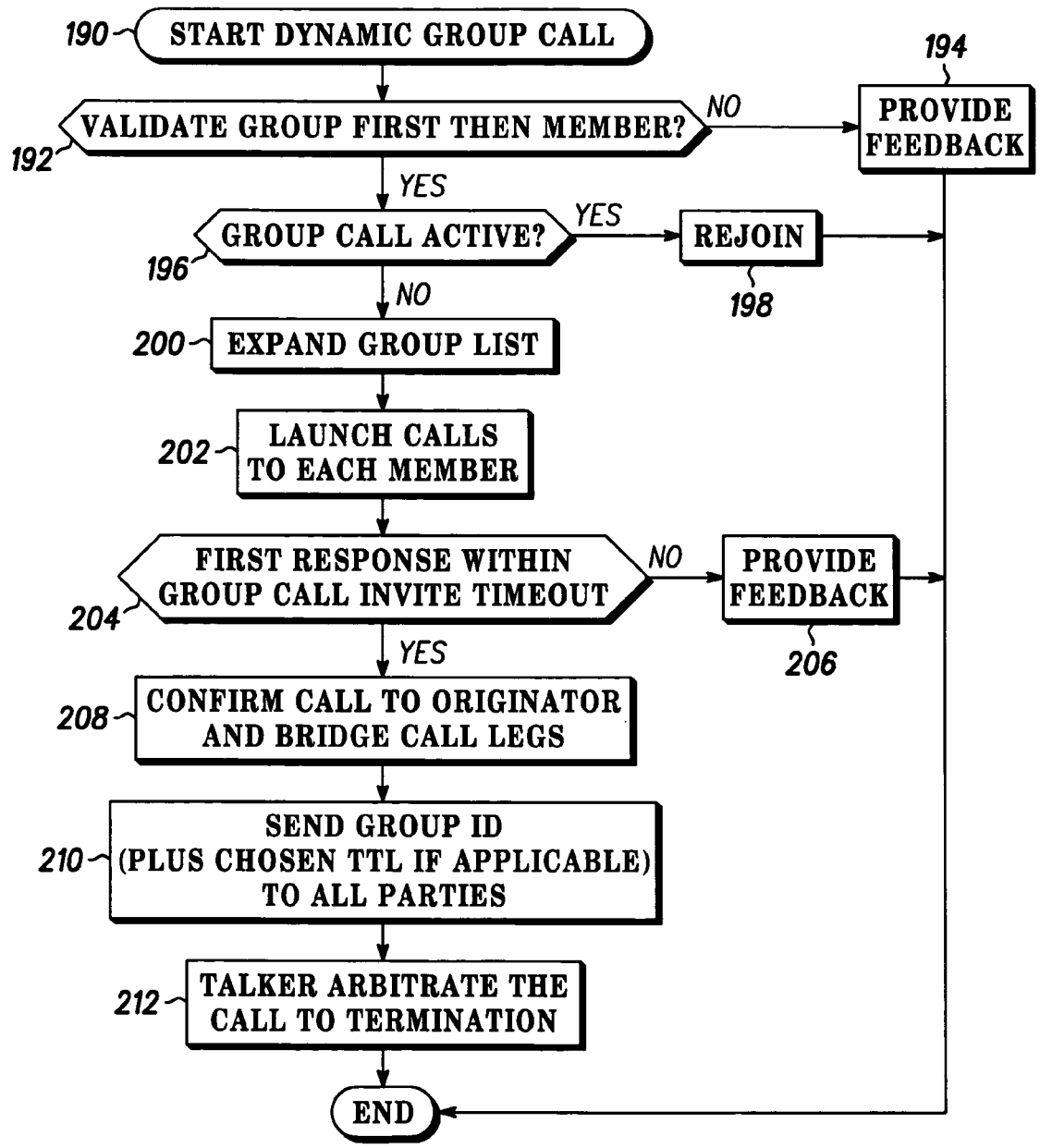
FIG. 6 is a flow chart of a response by the network for group call establishment.

FIG. 6 is a flow chart of the establishment or start for the dynamic group call indicated by an originator 10 to the network. When the network receives the PTT indication to initiate the dynamic group call, block 190 is entered.

Block 192 determines whether the originator is a valid group member, and whether the group itself is valid. If the originator or the group itself is not valid block 192 transfers control to block 194 via the no path. Block 194 provides feedback of the inability to go forward with the dynamic group call due to an invalidity to the originator 10. Then the process is ended.

If both the group and originator are valid, block 192 transfers control to block 196 via the yes path. Block 196 determines whether the group call is already active. If it is, block 196 transfers control to block 198. In block 198, since the group call is already active, a group call member must be attempting to rejoin the call and this process is initiated. Then the process is ended.

If the group call is inactive, block 196 transfers control to block 200 via the no path. Block 200 expands the group list. The group list is retrieved from the database and a determination is made of each group call member's IP address. Next, block 202 launches a call to each of the dynamic group call members.

Next, block 204 determines whether a first response from one of the group call members is received within a time out period. If the response is not received within the time out period, block 204 transfers control to block 206 via the no path. Block 206 indicates to the originating user that the group call has failed. Then the process is ended. Note that other call start criteria may be used, for example, an alternative could be that all group call members must respond within a time out period before moving to block 208. Or, there may be no time out period defined at all in which case the control would be immediately transferred to block 208, whether or not any group members responded.

If the response is within the time out period, block 204 transfers control to block 208 via the yes path. Block 208 confirms the call is successful back to the originator 10 and bridges each of the members to the call (legs) to a common link. Next, the group identity is sent to each of the members that have responded to the group call, block 210. If the optional time to live feature is applicable, the time to live field 88 is also returned to each of the responding group call members. The talker in the group call is then arbitrated among the members until the call is terminated, block 212. The process is then ended.

Figure 7:
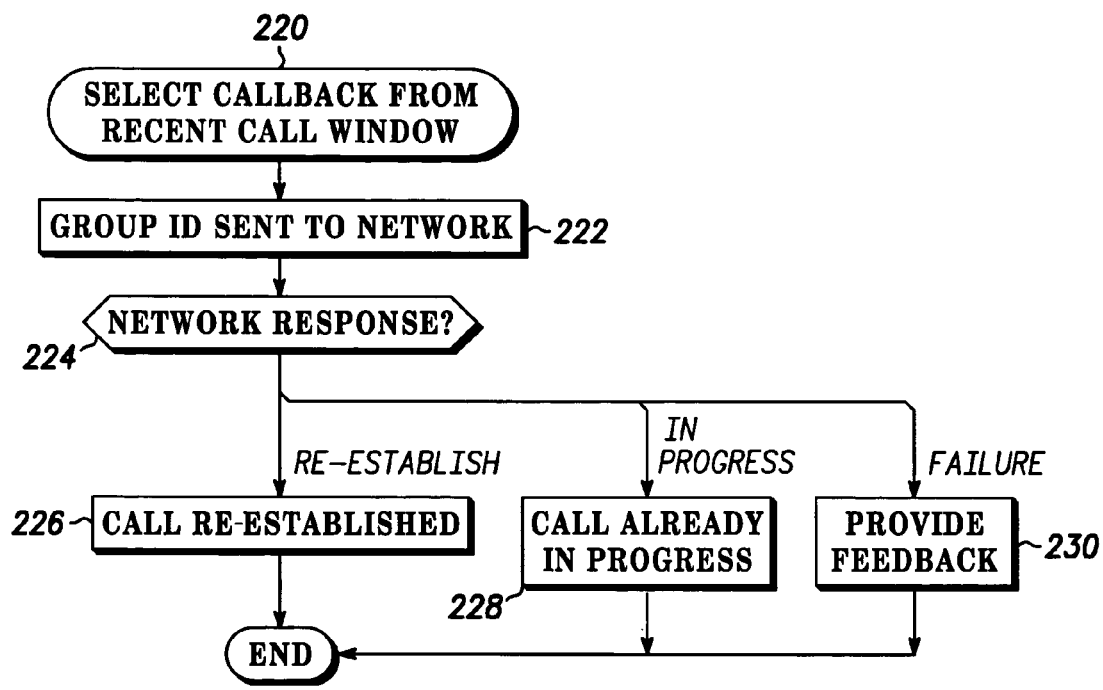
FIG. 7 is a flow chart of a group call method callback feature in accordance with the present invention.

FIG. 7 depicts the call back process for a member of a group who wishes to call back (or reestablish) a dynamic group call after it has ended.

Once the call back request is detected, block 220 is entered. A similar procedure for call setup is followed as with other group calls. This procedure is as described above with reference to FIG. 6.

The group call member wishing to call back sends the group ID to the server, block 222. Next, the network determines a response from the group ID and member ID. The network determines whether the request from the group member is for a call reestablishment, rejoining a call in progress, or the attempt by the group member fails.

If the network determined that the request from the user was for a call reestablishment, block 224 transfers control to block 226 via the call reestablishment path. Block 226 re-executes the method mentioned above for establishing a dynamic call except the originator now is a member of the dynamic group and may not be the original originator. The call is reestablished and dialogue begins. Then the process is ended.

If the network response is determined to be a call in progress, block 224 transfers control to block to 228 via the call in progress path. The user is then rejoined to a call by the procedure mentioned above and becomes a listener to the call since the call is already in progress. Then the process is ended.

If the detected network response is that the attempt to reestablish or rejoin the call is failed, block 224 transfers control to block 230 via the failure path. Failures may include no response from the other group members, an invalid group ID, the time to live (TTL) for the life of the particular dynamic group call has expired, etc. If a failure is detected, block 230 provides feedback to the requesting group member. Then the process is ended.

The dynamic group call method described herein provides highly selectable and automated group call services for dispatch or PTT type calls. The dynamic call method enables individuals to create group call lists dynamically for group dispatch communications. Further, the dynamic group call method supports a call back feature service for each member of the group call. Further, and optionally, each of the group call member lists may be set to expire at particular times thereby avoiding clogging the group call service provided by the network. The group call services are all provided directly to the end user or group member without operator intervention. This method may also operate on a number of networks such as, GSM, CDMA, UMTS and various wireless or wireline LANs.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A method for dynamic group call from a first user to a group of second users via a network including a server, the method for dynamic group call comprising the steps of:
   specifying a predetermined limit as to a number of second users permitted to join the group of second users;
   dynamically selecting, by the first user without the network, a selected user for inclusion in the group of second users;
   determining whether a number of selected second users is within the predetermined limit;
   if the number of selected second users is within the predetermined limit, adding by the first user the selected user to the group of second users;
   forwarding a list of dynamic group call members for the group of second users to the network for validation,
   receiving a group identification for the list of dynamic group call members if the list of dynamic group call members is valid; and
   initiating the dynamic group call between the first user and the group of second users after the list of dynamic group call members is validated and the first user receives the group identification.

2. The method for dynamic group call as claimed in claim 1, wherein there is further included a step of determining by the first user that the member is to be added to the group of second users.

3. The method for dynamic group call as claimed in claim 1, wherein if the number of selected second users is not within the predetermined limit, there is further included a step of providing a message to the first user indicating a fault.

4. The method for dynamic group call as claimed in claim 1, wherein the step of adding by the first user includes a step of transmitting the list of second users by the first user to the second user and to the network.

5. The method for dynamic group call as claimed in claim 4, wherein there is further included a step of storing the member in a database corresponding to the dynamic group call.

6. The method for dynamic group call as claimed in claim 1, wherein there is further included a step of creating the network a group identity.

7. The method for claim 1 further comprising if the dynamic group call list is invalid, providing a message by the network to the first user that a failure has occurred.

8. The method for claim 1 further comprising if the dynamic group call list is validated, storing a dynamic group call identity by the first user.

9. The method for claim 1 further comprising determining by the network whether a dynamic group call identifier is available in a database wherein the database has a plurality of identifiers.

10. The method for claim 9 further comprising if there is a dynamic group call identifier available in the database, creating a unique group ID for the dynamic group call list from one the plurality of identifiers.

11. The method for claim 9 if dynamic group call identifier is not available from the plurality of identifiers, selecting by the network a previously used dynamic group call identifier from the plurality of identifiers for the dynamic group call list.

12. A method for dynamic group call from a first user to a group of second users via a network including a server, the method for dynamic group call comprising the steps of:

specifying a predetermined limit as to a number of second users permitted to join the group of second users;

dynamically selecting, by the first user without the network or the server, a selected group of second users;

determining whether a number of the selected group of second users is within the predetermined limit;

if the number of selected second users is within the predetermined limit, adding by the first user the selected group of second users;

forwarding a list of dynamic group call members for the group of second users to the network for validation, receiving a group identification for the list of dynamic group call members if the list of dynamic group call members is valid; and initiating the dynamic group call between the first user and the group of second users after the list of dynamic group call members is validated and the first user receives the group identification.

13. The method for dynamic group call as claimed in claim 12, wherein there is further included a step of determining by the first user that the dynamic group call is adding the group of second users.

14. The method for dynamic group call as claimed in claim 12, wherein if the selected number of second users is not within the predetermined limit, there is further included a step of providing a message to the first user indicating a fault.

15. The method for dynamic group call as claimed in claim 12, wherein the step of adding by the first user includes a step of transmitting the list of second users by the first user to the selected second user and to the network.

16. The method for dynamic group call as claimed in claim 15, wherein there is further included a step of storing the group of second users in a database.

17. The method for dynamic group call as claimed in claim 12, wherein there is further included a step of creating the network a group identity.

18. The method for dynamic group call as claimed in claim 12, wherein there is further included a step of determining whether a number of users exceeds a predetermined limit.

19. The method for claim 12 further comprising if the dynamic group call list is invalid, providing a message by the network to the first user that a failure has occurred.

20. The method for claim 12 further comprising if the dynamic group call list is validated, storing a dynamic group call identity by the first user.

21. The method for claim 12 further comprising determining by the network whether a dynamic group call identifier is available in a database wherein the database has a plurality of identifiers.

22. The method for claim 21 further comprising if there is a dynamic group call identifier available in the database, creating a unique group ID for the dynamic group call list from one the plurality of identifiers.

23. The method for claim 21 if dynamic group call identifier is not available from the plurality of identifiers, selecting by the network a previously used dynamic group call identifier from the plurality of identifiers for the dynamic group call list.

24. In a first mobile unit, a method for dynamic group call from the first mobile unit to a group of second mobile units via a network including a server, comprising the steps of:

specifying a predetermined limit as to a number of second mobile units permitted to join the group of second mobile units;

dynamically selecting, by the first mobile unit without the network, at least one other second mobile unit for inclusion in the group of second mobile units;

determining whether a total number of selected second mobile units is within a predetermined limit;

if the total number of selected second mobile units is within the predetermined limit, adding by the first mobile unit the selected second mobile unit to the group of second mobile units;

forwarding a list of dynamic group call members for the group of second mobile units to the network for validation, receiving a group identification for the list of dynamic group call members if the list of dynamic group call members is valid; and initiating the dynamic group call between the first user and the group of second mobile units after the list of dynamic group call members is validated and the first user receives the group identification.

* * * * *

UNITED STATES PATENT AND TRADEMARK OFFICE
CERTIFICATE OF CORRECTION

PATENT NO. : 7,711,382 B2  
APPLICATION NO. : 10/788759  
DATED : May 4, 2010  
INVENTOR(S) : Oxley et al.

It is certified that error appears in the above-identified patent and that said Letters Patent is hereby corrected as shown below:

IN THE CLAIMS

1. In Column 8, Line 61, delete "9 if" and insert -- 9 further comprising if --, therefor.

2. In Column 10, Line 12, delete "21 if" and insert -- 21 further comprising if --, therefor.

Signed and Sealed this  
Eighth Day of November, 2011

David J. Kappos  
*Director of the United States Patent and Trademark Office*